Nov. 7, 1939.   C. C. SCHUETZ   2,179,057
HEAT INSULATION
Filed May 3, 1937   2 Sheets—Sheet 1.

Inventor
Clyde C. Schuetz
By Amb, Thiess, Olsen & Mecklenburger
Attys.

Nov. 7, 1939.  C. C. SCHUETZ  2,179,057
HEAT INSULATION
Filed May 3, 1937   2 Sheets-Sheet 2

Inventor:
Clyde C. Schuetz
By Ames, Thiess, Olson & Mecklenburger
Attys.

Patented Nov. 7, 1939

2,179,057

UNITED STATES PATENT OFFICE 2,179,057

HEAT INSULATION

Clyde C. Schuetz, Chicago, Ill., assignor to United States Gypsum Company, Chicago, Ill., a corporation of Illinois Application May 3, 1937, Serial No. 140,343

8 Claims. (Cl. 154—45)

My invention relates to insulation materials, more particularly to heat insulation of laminated or air-cell construction, and has for an object the provision of improved heat insulation of this character which is highly efficient and which is inexpensive to construct.

In forming air-cell insulation from a plurality of indented or corrrugated membranes, it is of course highly important that nesting of the adjacent membranes or laminations be prevented, and it has heretofore been common practice to provide flat separating or dividing sheets between the indented membranes for preventing nesting thereof. Furthermore, in order to eliminate these additional separating sheets, it has been proposed to form laminated insulation of this general character from alternate laminations indented with different patterns so as to prevent nesting. The provision of different patterns, of course, requires additional indenting equipment and the carrying of extra stock, and accordingly something is yet to be desired in laminated insulation of this character. It is therefore a further object of my invention to provide laminated air-cell insulation which is formed without special separating sheets from properly arranged laminations, indented with a single pattern, and which possesses one or more of the following characteristics: a large number of totally enclosed dead air spaces are provided, nesting of adjacent laminations is prevented, and straight air channels extending substantially at right angles to the edges of the insulation are entirely prevented.

In carrying out my invention in one form, a suitable membrane is indented from one side to provide spaced protuberances on the opposite surface thereof, and a plurality of layers of the indented membrane are arranged in face-to-face relation with alternate layers in reversed relation to provide a laminated structure in which the protuberances on adjacent laminations face each other to provide air-cells therebetween, and the indented surfaces face each other to provide a plurality of totally enclosed dead air spaces.

More particularly, the laminations may comprise sheets of insulation material and the indentations and protuberances therein are elongate in form and spaced to provide a plurality of discontinuous rows, the long dimension of each protuberance extending obliquely with respect to the edges of the sheets and being greater than the spacing of the rows. When the indented sheets are assembled to form the laminated structure with the protuberances on the adjacent sheets facing each other, the rows of protuberances on the respective sheets extend at substantially right angles to each other so that nesting of the sheets is prevented and tortuous air-cells are provided therebetween. In some cases it may be desirable to coat the surface of the sheets from which the protuberances extend with a thin metallic coating such, for example, as a sheet of metal foil, or it may be desirable to provide a sheet of metal foil between the adjacent indented sheets so that the opposite surfaces of the foil are engaged by the crests of the protuberances.

In accordance with my invention, the indented sheets may be assembled in various ways to provide different forms of laminated insulation. For example, a plurality of indented sheets may be assembled as described above, and adhesively secured together to provide a substantially rigid insulating board, or a pair of sheets arranged in reversed relation may be spirally wound to form a pipe covering or the like, the two interlaying sheets forming, by reason of the face-to-face relation of the protuberances and the indentations, a plurality of totally enclosed dead air spaces and a plurality of tortuous air-cells or channels which substantially diminish the losses due to the "chimney effect" usually encountered in air-cell pipe insulation having straight vertical air channels.

For a more complete understanding of my invention, reference should now be had to the drawings in which:

Figure 1 is a fragmentary plan view of an indented membrane or sheet embodying my invention;

Figs. 2 and 3 are sectional views, respectively taken along the lines 2—2 and 3—3 of Fig. 1;

Figure 1:
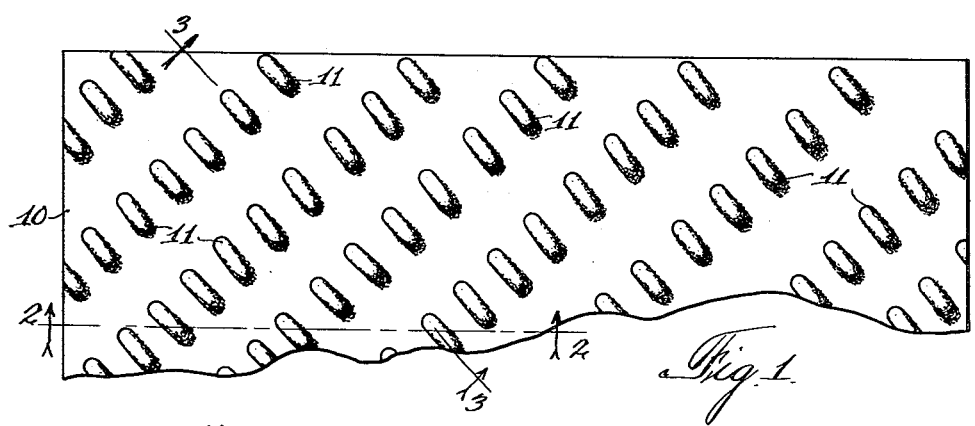
Figure 2:
Figure 3:

Referring first to Figs. 1, 2, and 3, I have shown my invention as applied to a membrane or sheet of insulating material 10 which is indented from its lower side to provide a plurality of elongate spaced protuberances 11 on the upper surface thereof, which protuberances are arranged to form discontinuous rows on the upper surface, the line 3—3 being taken along one of these rows. As shown, the long dimension of each of the protuberances 11 is somewhat greater than the spacing of the discontinuous rows, and this long dimension extends obliquely with respect to the edges of the membrane 10.

Although my invention is not limited thereto, the membrane 10 preferably comprises a sheet of asbestos paper or felt, and the indentations and protuberances may be formed therein in any suitable manner well known in the art. For example, the indentations may be formed by passing the sheet 10 through suitable indenting rolls, or the sheet 10 may be pressed between suitable indenting plates. More specifically, the indentations may be formed by providing rolls or plates having cooperating raised and recessed portions, or they may be formed by causing the raised portions on a hard roll or plate to be imbedded in the surface of a soft roll or plate such, for example, as a soft rubber covered roll or plate.

Figure 4:
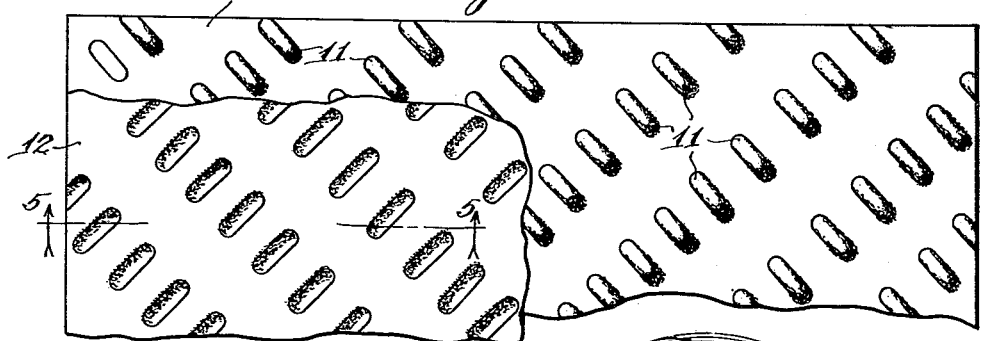
Fig. 4 is a fragmentary elevational view of an insulating structure formed from two membranes of the type shown in Fig. 1, the upper membrane being broken away better to illustrate the assembly of the sheets.

In the preferred embodiment of my invention shown in Figs. 1, 2, and 3, the long dimension of the protuberances 11 is disposed at an angle of approximately 45 degrees to the edges of the sheets, and in Fig. 4 I have shown one manner in which a pair of membranes thus formed may be assembled to provide a laminated air-cell insulating structure. Thus, in Fig. 4, the insulating structure shown is formed by superimposing on the indented sheet 10 a similar indented sheet or membrance 12 which is disposed in reversed relation with respect to the sheet 10, so that the elongate protuberances 13 extend downwardly from the lower surface of the sheet 12 in face-to-face relation with the protuberances 11. As shown best in Fig. 5, the protuberances 11 and 13 engage each other to provide air-cells between the sheets 10 and 12, and it will be apparent upon inspection of Fig. 4 that since the long dimension of each of the protuberances is greater than the spacing of the rows of protuberances, each of the protuberances 13 engages at least one of the protuberances 11 so that nesting of the sheets is prevented. Furthermore, the obliquely extending rows of protuberances on the respective sheets 10 and 12 cross each other at a substantial angle, and, by reason of the staggered relation of the protuberances thus obtained, the air-cells or channels formed between the sheets are tortuous with respect to the edges of the sheets. In other words, no straight air channels extending at right angles to the edges of the sheets are provided in insulating structures formed in accordance with my invention.

Figure 5:
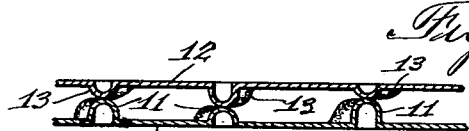
Fig. 5 is a sectional view taken along the line 5—5 of Fig. 4.
Figure 6:
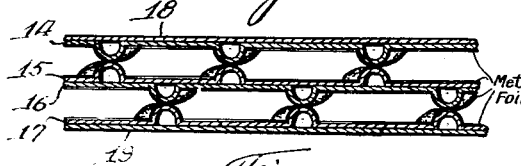
Fig. 6 is a sectional view of a modified form of insulating structure embodying my invention.

While the laminated insulating structure shown in Figs. 4 and 5 comprises only two laminations, it will be apparent that any desired number may be provided and in Fig. 6 I have shown a laminated structure composed of four laminations or membranes 14, 15, 16, and 17, respectively, the laminations 15 and 17 being reversed relative to the laminations 14 and 16. As here shown, the indented surface of the sheet 15 faces the indented surface of the sheet 16 so as to provide a plurality of totally enclosed dead air spaces, which dead air spaces materially increase the insulating quality of the laminated structure, and, if desired, suitable covering sheets 18 and 19 may be provided on the outer indented surfaces of the sheets 14 and 17 so as to provide additional totally enclosed dead air spaces. In some cases laminated structures embodying my invention may be used in face-to-face relation with suitable walls or similar structures, and in such cases the covering members 18 and 19 may of course be omitted, since the supporting surface itself then cooperates with the outer indented surfaces of the laminated structure to provide totally enclosed dead air spaces.

As will be understood by those skilled in the art, a considerable portion of the heat transmitted through an insulating structure is transmitted in the form of radiant heat, and, if desired, laminated structures embodying my invention may be provided with heat reflective coatings, preferably metallic, on the surfaces of the laminations from which the protuberances extend. Thus, in the laminated structure shown in Fig. 6, the upper surfaces of the laminations 15 and 17 and the lower surfaces of the laminations 14 and 16 are provided with a coating of metal foil, preferably aluminum foil, adhesively secured thereto. These foil coatings thus define the air-cells between the adjacent laminations so as to minimize the transfer of radiant heat through the laminated insulating structure.

Figure 12:
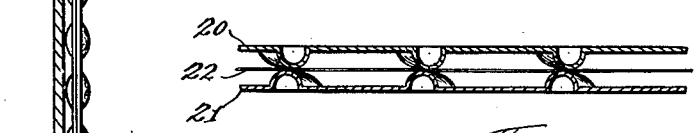
Fig. 12 is a cross-sectional view illustrating a still further modification of my invention.

In some cases it may be desirable to provide foil coatings only on the surfaces of the laminations 14 and 16, or a single sheet of foil may be provided as shown in Fig. 12, disposed between and supported by the face-to-face protuberances on adjacent laminations. Thus in Fig. 12, two indented laminations 20 and 21 are provided with a single sheet of foil 22 disposed therebetween so that the opposite surfaces of the foil cooperate with the indented sheets 20 and 21 to define suitable air-cells. Preferably, the crests of the protuberances extending from the laminations 20 and 21 are adhesively secured to the foil 22 so as to support the foil in the position shown in Fig. 12.

Referring again to Figs. 4, 5, and 6, it will be apparent that the laminated insulating structures there shown may be formed by superimposing any desired number of properly indented laminations, and that the laminations may be secured together in any desired manner as, for example, by stapling or by similar metallic clips. In many cases, however, it is desirable to permanently unite the laminations by means of a suitable adhesive, and while this may be accomplished in various manners, I prefer to form such laminated structures by providing two rolls of properly indented membranes on mandrels that are free to rotate, the mandrels being so mounted that the axes thereof are horizontal and parallel, with one mandrel disposed above the other. The roll of indented material on the upper mandrel is arranged so that the protuberances are directed downwardly and the material on the lower mandrel is so arranged that the protuberances are directed upwardly, so that when the two laminated sheets are drawn from the mandrels simultaneously, point to point contact of the shown in Fig. 11, without cutting the indented sheet. When so applied, the indented surfaces of the adjacent membranes face each other and as many courses as desired may be provided by carrying the roll of material back and forth along the roof or wall structure.

In addition to its use as a sheathing or roofing paper, material of this character forms an excellent base for receiving asbestos cement shingles, since the material, by reason of its cushioning and insulating characteristics, is effective to prevent rattling of the shingles or to absorb a large proportion of the sound caused by rattling of the shingles. Furthermore, material of this character may be used in any other place where a thin fibrous sheet possessing heat insulation qualities, as well as sound absorbing characteristics, is desired.

Furthermore, rubber impregnated insulating materials may be formed in accordance with my invention by impregnating a suitable fabric with unvulcanized rubber and then vulcanizing the impregnated fabric during the indenting operation, so as to impart to the indentations the necessary stiffness. Materials of this type are particularly useful in connection with the insulation of objects subjected to considerable vibration such, for example, as oil pipes carrying crude oil to the refineries. In addition, desired amounts of rust inhibiting re-agents may be incorporated in the impregnating material, and a combined rust inhibiting and insulating product may thus be formed.

As indicated above, laminated insulation embodying my invention may be formed from any suitable membrane or sheet so long as the material used is sufficiently ductile to permit the forming of indentations therein. Obviously, however, the protuberances must possess sufficient strength to support their own weight or the weight of additional layers that may be superimposed thereon, and accordingly the material must possess sufficient thickness or strength to be self-supporting, either due to its own characteristics or due to suitable impregnants. When forming insulation embodying my invention from asbestos or similar fibrous materials, I may utilize suitable binding or impregnating materials, or both, such, for example, as starch, sodium silicate, etc., which stiffen upon drying, and I may form the indentations while the sheet is in a moist condition. Thus, upon drying the reinforcing material stiffens and maintains the shape of the indentations.

In addition to the materials mentioned above, my inventiontion may also be applied to metallic membranes such as aluminum, copper, or other sheets of any desirable gauge or thickness, in order to provide all metal insulation of the general type well known in the art, which insulation is particularly effective in preevnting the transfer of heat by radiation.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A laminated structure comprising a plurality of membranes each of which is indented from one side to provide a plurality of protuberances on the opposite surface thereof spaced to form a plurality of discontinuous rows, said membranes being positioned in face-to-face relation with alternate ones thereof in reversed relation so that the spaced protuberances on one membrane engage the protuberances on an adjacent membrane with said discontinuous rows on said membranes extending at a substantial angle to each other to prevent nesting of said protuberances and provide a plurality of air-cells between said membranes, the indented surface of said one membrane facing the similar indented surface of an adjacent membrane to provide a plurality of totally enclosed dead air spaces.

2. A laminated heat insulating structure comprising a plurality of sheets of fibrous insulating material each of which is provided with a thin metallic coating on one surface thereof and is indented from the opposite side to provide protuberances on said coated surface spaced to form a plurality of discontinuous rows, said sheets being positioned in face-to-face relation with alternate sheets in reversed relation so that the protuberances on one sheet engage the protuberances on an adjacent sheet with the discontinuous rows on said sheets extending at a substantial angle to each other to prevent nesting of said protuberances and to form air-cells defined by said metallic coatings, the indented surface on said one sheet facing the similar indented surface of an adjacent sheet to form a plurality of totally enclosed dead air spaces.

3. A laminated insulating material comprising a plurality of membranes, each of which is indented from one side to provide elongate protuberances on the opposite surface thereof spaced to form a plurality of discontinuous rows, the long dimension of each of said protuberances being at least equal to the spacing of said rows, said membranes being positioned in face-to-face relation and adhesively secured together with alternate membranes in reversed relation so that the elongate protuberances on one membrane engage the elongate protuberances on an adjacent membrane with the discontinuous rows on said membranes extending at a substantial angle to each other to prevent nesting of said membranes and provide air-cells therebetween, the indented surface of said one membrane facing the similar indented surface of an adjacent membrane to provide a plurality of totally enclosed dead air spaces.

4. A laminated insulating structure comprising a plurality of sheets of insulating material, each of which is indented from one side to provide elongate protuberances on the opposite surface thereof spaced to form a plurality of discontinuous rows, the long dimension of each of said elongate protuberances extending at an oblique angle to the edges of said sheets and being at least equal to the spacing of said rows, said sheets being positioned in face-to-face relation with alternate sheets in reversed relation so that the elongate protuberances on adjacent sheets face each other with the discontinuous rows on said adjacent sheets extending at a substantial angle to each other to prevent nesting of said sheets and provide tortuous air-cells therebetween, the indented surface of said sheets facing the similar indented surface of adjacent sheets to provide a plurality of totally enclosed dead air spaces.

5. A laminated insulating structure comprising a plurality of membranes, the respective adjacent faces of which are provided with elongate protuberances spaced to form a plurality of disconprotuberances will be obtained as shown in Figs. 4 and 5. In order to apply suitable adhesive to the indented sheets as the sheets are drawn from the mandrel, adhesive-applying rolls of the type well known in the art may be provided adjacent the upper and lower indented sheets, which adhesive-applying rolls are arranged to engage only the crests of the protuberances. In addition, a suitable adhesive-applying roll is provided adjacent the upper surface of the top lamination, and this adhesive-applying roll is preferably of the type provided with raised portions for applying adhesive to the upper surface only at spaced intervals.

It will thus be apparent that as the two indented sheets are simultaneously drawn from the mandrels and positioned in face-to-face relation with adhesive between the engaging protuberances, a double ply laminated structure is obtained with adhesive on the upper surface, and this double ply laminated structure may be cut off in suitable lengths, the cut-off lengths being assembled to build up any desired thickness of insulation.

Figure 7:
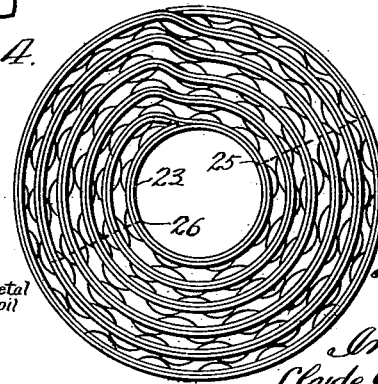
Fig. 7 is an end view of a pipe covering embodying my invention.

Instead of severing selected lengths of the double ply laminated structure to form flat insulation of the type shown in Figs. 4, 5, and 6, the double ply bonded material may be spirally wound around a mandrel to form a pipe covering of the type shown in Fig. 7. It will be apparent that as this material is spirally wound, the intended surfaces of the two interlaying laminations engage each other to provide a plurality of dead air spaces, and the engaging protuberances form tortuous air-cells or channels as described above in connection with Figs. 4, 5, and 6. This tortuous air-cell arrangement is particularly advantageous in connection with pipe coverings to be used on vertically extending pipes, since considerable heat loss has heretofore been encountered in vertical pipe coverings formed by spirally winding ordinary corrugated material, due to the "chimney effect" obtained by reason of the fact that a continuous vertical channel acts as a flue for convection currents.

In Fig. 7 I have shown the spirally wound pipe covering as mounted on a supporting cylinder or tube 23, and provided with an outer cylindrical covering 24, but it will of course be apparent that the inner tube 23 and the covering 24 may be omitted if desired, in which case the innermost layer of the indented material directly engages the pipe when the insulating structure is mounted thereon. In order that the spirally wound insulating structure shown in Fig. 7 may be readily assembled on a pipe, the structure may be cut along the broken lines 25 and 26 in accordance with the usual practice in pipe coverings of this character.

Figure 8:
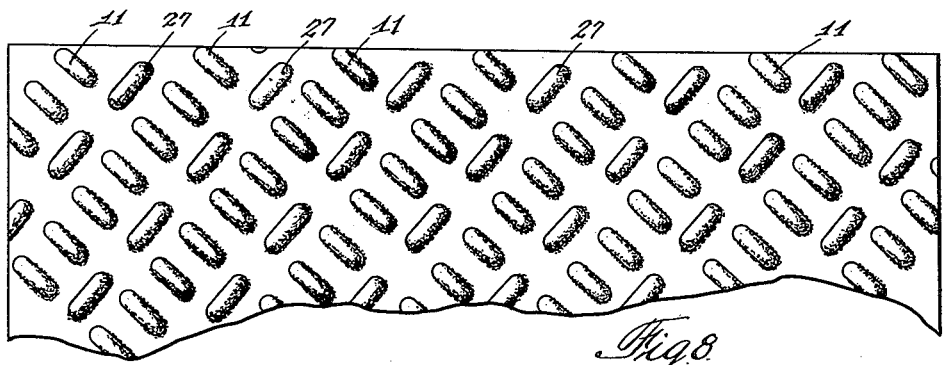
Fig. 8 is a fragmentary plan view similar to Fig. 1, of a modified intended membrane constructed in accordance with my invention.

It will, of course, be apparent that my invention is not limited to the exact shape or arrangement of the protuberances shown in Figs. 1 to 7 inclusive, since any desired shape of protuberance may be used, so long as the dimension of the protuberances taken parallel to the direction of the discontinuous rows, is greater than the spacing between the rows. Furthermore, additional protuberances arranged as desired may be provided. Thus in Fig. 8, I have shown an indented membrane embodying my invention which is similar to the membrane 10 shown in Fig. 1, except that additional protuberances 27 are provided arranged in rows which extend substantially at right angles to the rows formed by the protuberances 11, these additional protuberances 27, of course, assisting in preventing nesting of the membranes when assembled to form a laminated structure. In addition, these additional protuberances assist in breaking up the air-cells into tortuous channels.

Figure 9:
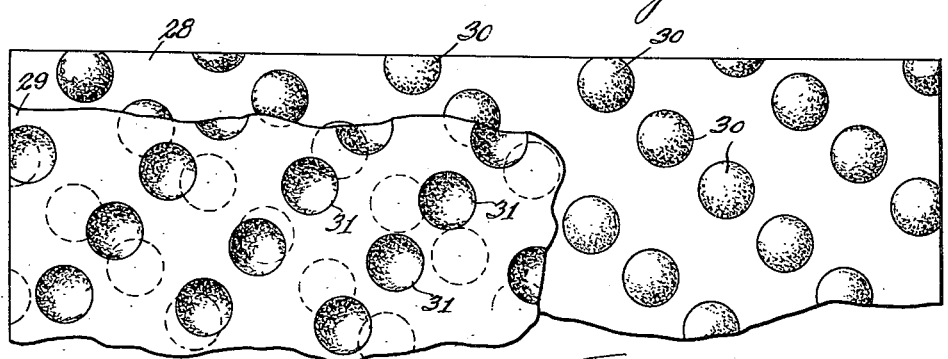
Fig. 9 is a fragmentary view similar to Fig. 4, illustrating an insulating structure constituting a further modification of my invention.

In Fig. 9 I have shown a laminated structure embodying my invention formed from a pair of membranes 28 and 29, each of which is provided with circular protuberances 30 and 31 respectively, the membranes 28 and 29 being arranged in relatively reversed relation. Thus the protuberances 30 are arranged in rows which slope upwardly to the right as viewed in Fig. 9, while the protuberances 31 are arranged in rows which slope upwardly to the left, the diameter of each protuberance being somewhat greater than the spacing between the rows formed thereby.

A particular advantage of laminated insulation constructed in accordance with my invention is found in the fact that the effective depth of the indentations may be controlled through wide limits. Thus laminated structures having from twelve to twenty-four laminations per inch of thickness are entirely feasible when formed from similarly indented sheets which differ only in the depth of the indentations. In the past it has been common practice to use corrugated air-cell insulation having four laminations per inch for temperatures up to 300° F. and to resort to other types of insulation for higher temperatures. I have found that in accordance with my invention, satisfactory insulation may be provided covering a range of temperature up to 700° F. while using a single set of indenting equipment, simply by regulating the depth of the indentations. For temperatures up to 300° F. I prefer to use twelve laminations per inch of thickness, and for temperatures from 300° to 700° F. I prefer to use twenty-four laminations per inch of thickness, the laminations in each case being formed from asbestos paper or felt having a weight of approximately five pounds per 100 square feet.

While my invention is particularly applicable to laminated structures in which individual laminations are formed from asbestos paper or felt, as described above, it is not limited thereto but may also be employed in connection with roofing or sheathing materials. Thus, saturated or saturated and coated roofing or sheathing felts may be similarly indented in accordance with the principles of my invention.

The intended pattern may be formed directly in an unsaturated web in any conventional manner, and the indented sheet then impregnated and saturated, or, if desired, the web may be first saturated and coated and then indented by pressure, in either a hot or cold die. If, for example, an asphalt or resin impregnation is used, particularly of the thermoplastic or thermosetting type, a heated die may be used and maintained at a temperature sufficiently high to effect the desired setting reaction and the indented sheet may thereafter be cooled by a blast of cold air or other suitable means.

Figures 10, 11:
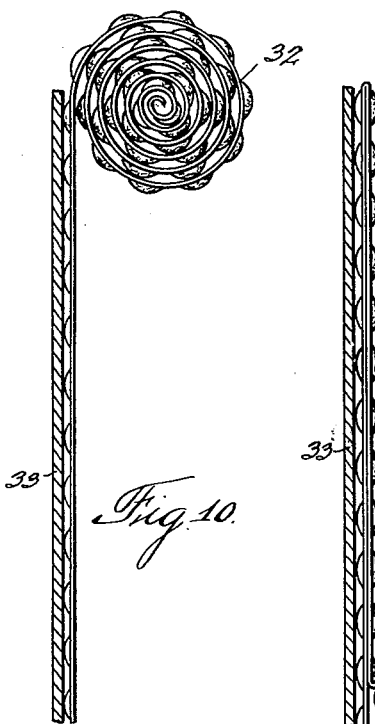
Figs. 10 and 11 are somewhat diagrammatic views illustrating one manner in which insulating materials embodying my invention may be applied to a building wall or structure for use as a sheathing or building paper.

Indented sheets thus prepared may be formed into standard rolls for handling and shipment, and may be applied to a roof or wall without preliminary cutting in the manner illustrated in Figs. 10 and 11. Thus, as shown in Fig. 10, a roll 32 of the indented sheet material may be placed with the protuberances on the outer layer of the roll facing a suitable wall or roof 33, a length of the material may be unrolled as shown, and a second course of material may be provided by returning the roll to its original position as tinuous rows, the long dimension of the protuberances on each membrane extending at a substantial angle to the long dimension of the protuberances on the adjacent membrane and said long dimension of each protuberance being at least equal to the spacing of the protuberances on the adjacent membrane whereby nesting of said membranes is substantially prevented.

6. A laminated insulating structure comprising a plurality of membranes adhesively secured together, the respective adjacent faces of said membranes being provided with elongate protuberances spaced to form discontinuous rows with the long dimension of each protuberance extending obliquely with respect to the edges of said insulating structure, said long dimension of each protuberance being at least equal to the spacing of the protuberances upon the adjacent membrane and the discontinuous rows on the adjacent membranes extending at a substantial angle to each other so that nesting of the membranes is substantially prevented and said protuberances provide tortuous channels between said membranes for providing air-cells therebetween and substantially eliminating convection currents in said air-cells.

7. An insulating covering for an object such as a pipe, said covering comprising a pair of interlaid spirally wound sheets of insulating material each of which is indented from one side to form a plurality of protuberances on the opposite surface thereof spaced to provide a plurality of discontinuous rows, said sheets being disposed in reversed relation so that when spirally wound the protuberances on said sheets face each other with said discontinuous rows on said sheets extending at a substantial angle to each other to prevent nesting of said sheets and provide air-cells therebetween, and the indented surfaces of said sheets face each other to provide a plurality of totally enclosed dead air spaces.

8. An insulating covering for an object such as a pipe, said covering comprising a pair of interlaid spirally wound sheets of insulating material each of which is indented from one side to form a plurality of elongate protuberances on the opposite surface thereof spaced to form a plurality of discontinuous rows, the long dimension of each protuberance being at least equal to the spacing of said rows, said sheets being disposed in reversed relation so that when spirally wound the elongate protuberances on said sheets face each other with the discontinuous rows on said sheets extending at a substantial angle to each other to prevent nesting of said sheets and provide tortuous air-cells therebetween, and so that the indented surfaces of said sheets face each other to provide a plurality of totally enclosed dead air spaces.

CLYDE C. SCHUETZ.